United States Patent
Engel et al.

(10) Patent No.: US 10,481,617 B2
(45) Date of Patent: Nov. 19, 2019

(54) METERING SYSTEM FOR AN AGRICULTURAL SYSTEM

(71) Applicant: CNH Industrial Canada, Ltd., Saskatoon (CA)

(72) Inventors: Gordon Anthony Engel, Saskatoon (CA); Gregory Jacob Erker, Saskatoon (CA); Anthony Charles Rapley, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 77 days.

(21) Appl. No.: 15/673,600

(22) Filed: Aug. 10, 2017

(65) Prior Publication Data
US 2019/0050002 A1 Feb. 14, 2019

(51) Int. Cl.
*G05D 7/06* (2006.01)
*G01F 13/00* (2006.01)
(Continued)

(52) U.S. Cl.
CPC ........... *G05D 7/0605* (2013.01); *A01C 7/102* (2013.01); *A01C 7/12* (2013.01); *A01C 19/02* (2013.01); *G01F 13/001* (2013.01); *A01C 7/06* (2013.01); *A01C 7/081* (2013.01); *A01C 7/082* (2013.01); *A01C 15/04* (2013.01)

(58) Field of Classification Search
CPC .......... G05D 7/0605; G05D 7/06; G05D 7/00; A01C 7/06; A01C 7/00; A01C 7/082; A01C 7/081; A01C 7/08; A01C 15/04; A01C 15/00; A01C 7/102; A01C 7/10;
(Continued)

(56) References Cited

U.S. PATENT DOCUMENTS

| 3,420,328 A | * | 1/1969 | Miller | ..................... F16H 63/42 |
| | | | | 180/271 |
| 5,025,951 A | | 6/1991 | Hook et al. | |
| | | (Continued) | | |

FOREIGN PATENT DOCUMENTS

WO 2014040190 A1 3/2014

OTHER PUBLICATIONS

"Accurate Metering of Seed and Fertilizer," Published Jan. 28, 2004, http://www.1.agric.gov.ab.ca/$department/deptdocs.nsf/all/eng8023, pp. 1-6 (6 pages).
(Continued)

*Primary Examiner* — Christopher J. Novosad
(74) *Attorney, Agent, or Firm* — Rebecca L. Henkel; Richard K. DeMille

(57) ABSTRACT

A metering system includes a first meter roller, such that the first meter roller includes many protrusions, such that each protrusion of the many protrusions drives flowable particulate material downwardly in response to rotation of the first meter roller. Furthermore, the metering system includes a drive shaft that is driven in rotation and a first transmission assembly that establishes a first direct mechanical linkage between the drive shaft and the first meter roller, such that the first transmission assembly shifts between a first plurality of gear ratios to drive the first meter roller in rotation at a respective first plurality of different speeds relative to the drive shaft.

11 Claims, 10 Drawing Sheets

(51) Int. Cl.
   *A01C 7/10*   (2006.01)
   *A01C 7/12*   (2006.01)
   *A01C 19/02*  (2006.01)
   *A01C 7/06*   (2006.01)
   *A01C 15/04*  (2006.01)
   *A01C 7/08*   (2006.01)

(58) Field of Classification Search
   CPC .......... A01C 7/12; A01C 19/02; A01C 19/00; G01F 13/001; G01F 13/00
   See application file for complete search history.

(56) References Cited

U.S. PATENT DOCUMENTS

| | | |
|---|---|---|
| 5,574,657 A | 11/1996 | Tofte et al. |
| 6,851,377 B2 | 2/2005 | Mayerle et al. |
| 7,726,251 B1 | 6/2010 | Peterson et al. |
| 8,196,534 B2 | 6/2012 | Meyer et al. |
| 8,601,963 B2 | 12/2013 | Friggstad |
| 8,733,257 B2 | 5/2014 | Beaujot et al. |
| 8,757,073 B2 | 6/2014 | Beaujot et al. |
| 2004/0035233 A1* | 2/2004 | Takeda .................. B62M 25/08 74/336 R |
| 2010/0070072 A1 | 3/2010 | Goldman et al. |
| 2010/0116974 A1 | 5/2010 | Liu et al. |
| 2011/0120356 A1 | 5/2011 | Wendte et al. |
| 2011/0178632 A1 | 7/2011 | Straeter |
| 2012/0174840 A1 | 7/2012 | Friggstad |
| 2013/0192503 A1 | 8/2013 | Henry et al. |
| 2014/0076218 A1 | 3/2014 | Liu |
| 2017/0055436 A1 | 3/2017 | Thompson et al. |
| 2017/0055437 A1 | 3/2017 | Thompson |

OTHER PUBLICATIONS

The Dakota Lakes Staff; "Multiple Section Control, Row Planters, Seeders, Drills, and Fertilizer Spreaders," Jul. 31, 2005, pp. 1-4 (4 pages).

* cited by examiner

METERING SYSTEM FOR AN AGRICULTURAL SYSTEM

BACKGROUND

The disclosure relates generally to a metering system for an agricultural system.

Generally, seeding implements (e.g., seeders) are towed behind a tractor or other work vehicle via a mounting bracket secured to a rigid frame of the implement. Seeding implements typically include multiple row units distributed across a width of the implement. Each row unit is configured to deposit seeds at a target depth beneath the soil surface of a field, thereby establishing rows of planted seeds. For example, each row unit typically includes a ground engaging tool or opener that forms a seeding path (e.g., trench) for seed deposition into the soil. A seed tube (e.g., coupled to the opener) is configured to deposit seeds and/or other agricultural flowable particulate materials (e.g., fertilizer) into the trench. The opener/seed tube may be followed by closing disc(s) that move displaced soil back into the trench and/or a packer wheel that packs the soil on top of the deposited seeds.

In certain configurations, an air cart is used to meter and deliver agricultural flowable particulate material (e.g., seeds, fertilizer, etc.) to the row units of the seeding implement. The air cart generally includes a storage tank (e.g., a pressurized tank), an air source (e.g., a blower), and a metering system. The flowable particulate material is typically gravity fed from the storage tank to the metering system which distributes a target volume of flowable particulate material into an air flow generated by the air source. The air flow carries the flowable particulate material to the row units via conduits extending between the air cart and the seeding implement. The metering system typically includes meter rollers that control the flow of flowable particulate material based on meter roller geometry and rotation rate.

The meter rollers are typically driven by a drive assembly, which may be configured to control the rotation rate of the meter rollers. However, certain drive assemblies may be expensive to manufacture and/or to install on the air cart (e.g., due to the complexity of the drive assembly), thereby increasing the cost of the air cart. In addition, due to spatial constraints of the air cart, it may be difficult and/or time consuming to mount certain drive assemblies to the air cart and/or to couple the drive assembly to the meter rollers.

BRIEF DESCRIPTION

In one embodiment, a metering system includes a first meter roller, such that the first meter roller includes many protrusions, such that each protrusion of the many protrusions drives flowable particulate material downwardly in response to rotation of the first meter roller. Furthermore, the metering system includes a drive shaft that is driven in rotation and a first transmission assembly that establishes a first direct mechanical linkage between the drive shaft and the first meter roller, such that the first transmission assembly shifts between a first plurality of gear ratios to drive the first meter roller in rotation at a respective first plurality of different speeds relative to the drive shaft.

In another embodiment, a metering system includes many meter rollers, such that each meter roller of the many meter rollers includes many protrusions, such that each protrusion of the corresponding many protrusions drives flowable particulate material downwardly in response to rotation of the meter roller. In addition, the metering system includes a drive shaft that is driven in rotation. Furthermore, the metering system includes many transmission assemblies each corresponding to a respective meter roller of the many meter rollers, such that each transmission assembly of the many transmission assemblies establishes a direct mechanical linkage between the drive shaft and the respective meter roller, and each transmission assembly of the many transmission assemblies shifts between many gear ratios to drive the respective meter roller in rotation at many different speeds relative to the drive shaft.

In a further embodiment, a metering system for an agricultural vehicle, includes many meter rollers, such that each meter roller of many meter rollers includes many protrusions, such that each protrusion of the corresponding many protrusions drives flowable particulate material downwardly in response to rotation of the meter roller. The metering system includes a drive shaft that is driven in rotation. Furthermore, the metering system includes many transmission assemblies each corresponding to a respective meter roller of the many meter rollers, such that each transmission assembly of the many transmission assemblies establishes a direct mechanical linkage between the drive shaft and the respective meter roller, and each transmission assembly of the many transmission assemblies shifts between many gear ratios to drive the respective meter roller in rotation at many different speeds relative to the drive shaft. The metering system also includes many moveable gears, such that each moveable gear of the many moveable gears establishes a gear ratio in response to a gear ratio control signal, such that each moveable gear of the many moveable gears establishes a rotatable connection between the respective meter roller and many gears corresponding to the respective transmission assembly.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
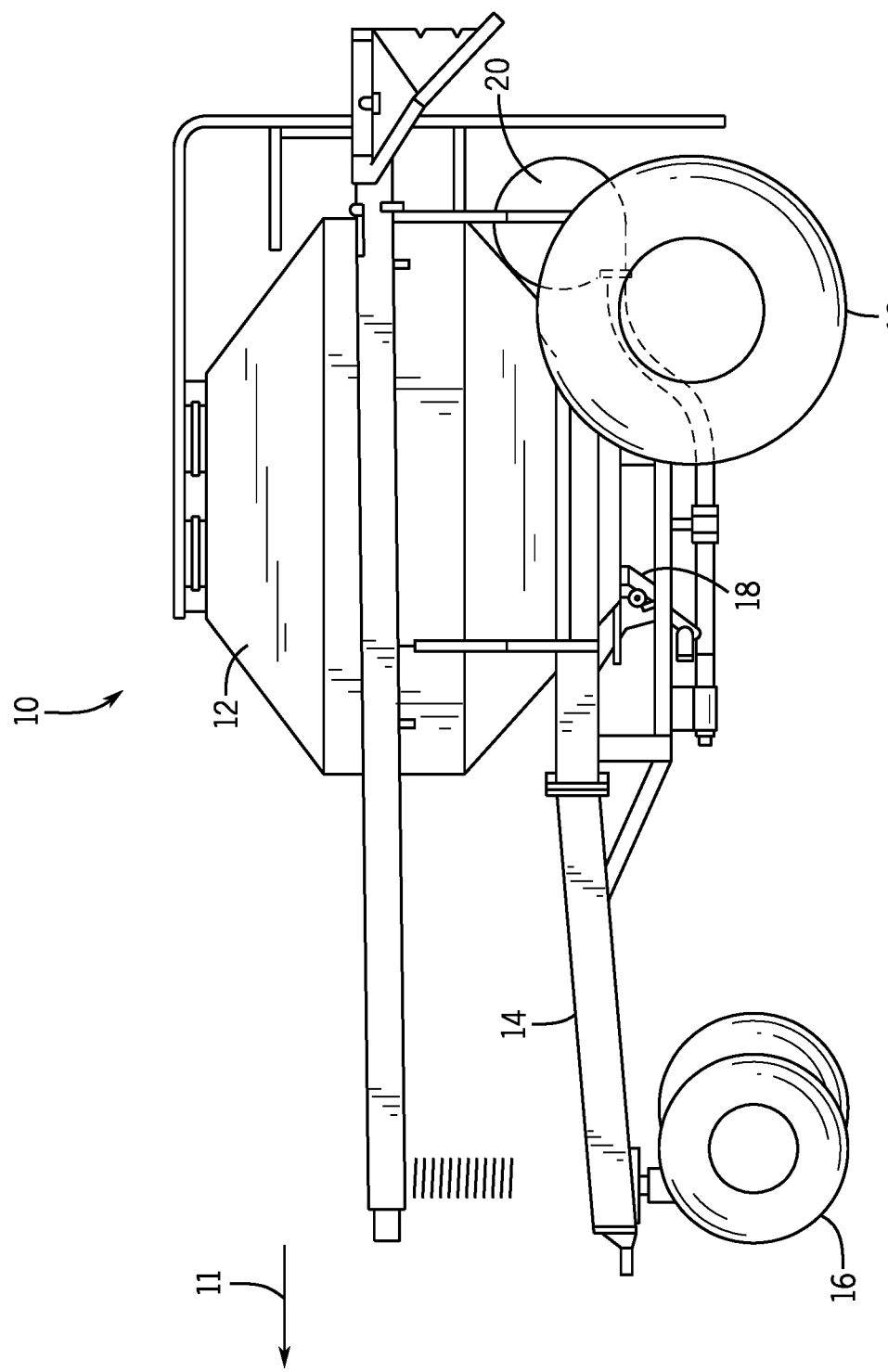
FIG. 1 is a side view of an embodiment of an air cart, including a metering system configured to control a flow of particulate material.

Turning now to the drawings, FIG. 1 is a side view of an air cart 10 (e.g., agricultural system) that may be used in conjunction with a towable agricultural implement to deposit seeds into the soil. For example, certain agricultural implements include row units configured to open the soil, dispense seeds into the soil opening, and re-close the soil. Such implements are generally coupled to a tow vehicle, such as a tractor, and pulled through a field. In certain configurations, seeds are conveyed to the row units by the illustrated air cart 10, which is generally towed in sequence with the implement along a direction of travel 11. In certain configurations, the air cart 10 may be configured to provide fertilizer to the row units, or a combination of seeds and fertilizer.

In the illustrated embodiment, the air cart 10 includes a storage tank 12, a frame 14, wheels 16, a metering system 18, and an air source 20. In certain configurations, the storage tank 12 includes multiple compartments for storing various flowable particulate materials. For example, one compartment may include seeds, such as canola or wheat, and another compartment may include a dry fertilizer. In such configurations, the air cart 10 is configured to deliver both the seeds and fertilizer to the implement. The frame 14 includes a towing hitch configured to couple to the implement or tow vehicle. As discussed in detail below, seeds and/or fertilizer within the storage tank 12 are gravity fed into the metering system 18. The metering system 18 includes one or more meter rollers that control the flow of material from the storage tank 12 into an air flow provided by the air source 20. The air flow then carries the material to the implement by pneumatic conduits. In this manner, the row units receive a supply of seeds and/or fertilizer for deposition within the soil.

Figure 2:
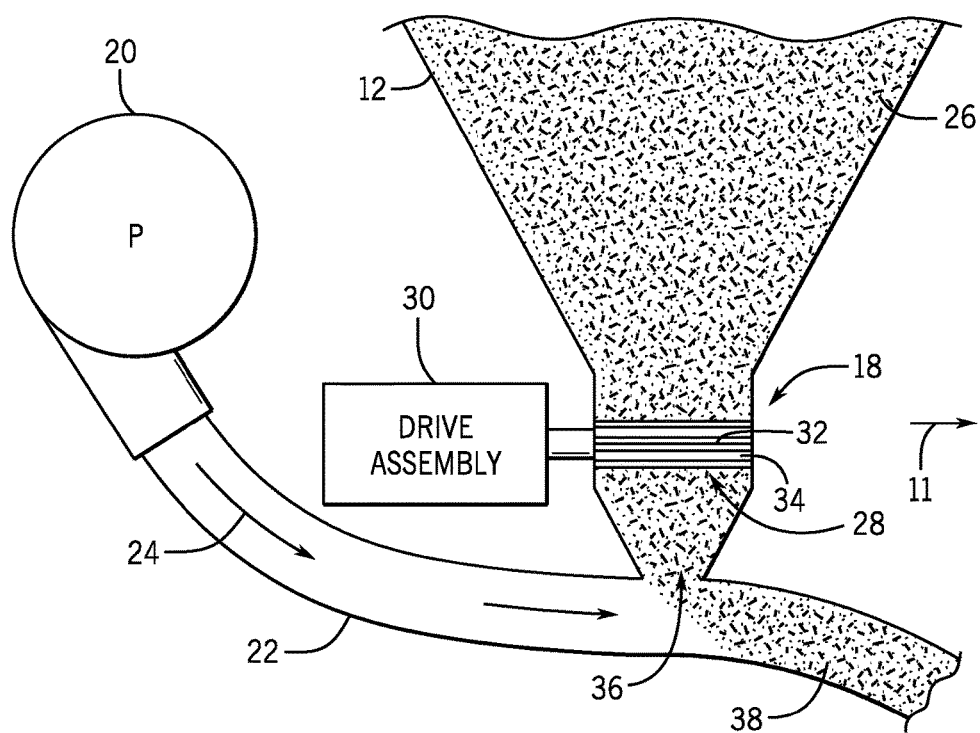
FIG. 2 is a schematic diagram of an embodiment of a metering system that may be employed within the air cart of FIG. 1.

FIG. 2 is a schematic diagram of an embodiment of a metering system 18 that may be employed within the air cart of FIG. 1. As illustrated, the air source 20 is coupled to a conduit 22 configured to flow air 24 past the metering system 18. The air source 20 may be a pump or blower powered by an electric or hydraulic motor, for example. Flowable particulate material 26 (e.g., seeds, fertilizer, etc.) within the storage tank 12 flows by gravity into the metering system 18. In certain embodiments, the storage tank 12 is pressurized such that a static pressure in the tank 12 is greater than or equal to a static pressure in the conduit 22, thereby facilitating an even flow of material through the metering system 18. The metering system 18 includes one or more meter rollers 28 (e.g., rotatable metering devices) configured to control the flow of material 26 into the air flow 24. For example, certain metering systems 18 may include twelve meter rollers 28, each disposed within an independent housing and each configured to flow particulate material into a respective conduit 22 for distribution to one or more respective row units of the agricultural implement. Such metering systems are known as "12-run" metering systems. However, in alternative embodiments, the metering system 18 may include more or fewer meter rollers, e.g., 1, 2, 3, 4, 5, 6, 7, 8, 9, 10, 11, 13, or more.

In the illustrated embodiment, the meter roller 28 is coupled to a drive assembly 30 configured to drive the meter roller 28 to rotate. In certain embodiments, the drive assembly 30 may include a drive unit, such as an electric or hydraulic motor, configured to drive one or more meter rollers to rotate. In further embodiments, the drive assembly 30 may be coupled to a wheel (e.g., via a gear assembly) such that rotation of the wheel drives the meter roller 28 to rotate. Such a configuration automatically varies the rotation rate of the meter roller 28 based on the speed of the air cart.

The meter roller 28 also includes protrusions, such as the illustrated flutes 32, and recesses 34. Each respective recess 34 is disposed between a respective pair of flutes 32. As the meter roller 28 rotates, the respective pair of flutes 32 moves the flowable particulate material 26 (e.g., agricultural product) disposed within the respective recess 34 downwardly, thereby transferring the flowable particulate material 26 to the conduit 22. The number and geometry of the flutes 32 are particularly configured to accommodate the flowable particulate material 26 being distributed. Certain meter rollers 28 may include six flutes 32 and a corresponding number of recesses 34. Alternative meter rollers may include more or fewer flutes 32 and/or recesses 34. For example, the meter roller 28 may include 1, 2, 3, 4, 5, 6, 8, 10, 12, 14, 15, 16, 18, 20, or any suitable number of flutes 32 and/or recesses 34. In addition, the depth of the recesses 34 and/or the height of the flutes 32 are configured to accommodate the flowable particulate material 26 within the storage tank 12. For example, a meter roller having deeper recesses 34 and fewer flutes 32 may be employed for larger seeds, while a meter roller having shallower recesses 34 and more flutes 32 may be employed for smaller seeds. Other parameters such as flute pitch (i.e., angle of the flute relative to a longitudinal/rotational axis) and flute angle (i.e., angle of the flute relative to a radial axis) may also be particularly selected to accommodate the flowable particulate material 26. While the illustrated meter roller includes flutes, it should be appreciated that in alternative embodiments, the meter roller may include other protrusions, and/or the recesses may be omitted.

In the illustrated embodiment, the meter roller 28 is oriented substantially parallel to the direction of travel 11 of the air cart. As used herein, substantially parallel may refer to an angle of about 0 to 45 degrees relative to an axis/direction (e.g., the direction of travel 11). In further embodiments, the meter roller may be oriented substantially perpendicular to the direction of travel, or at any other suitable angle.

For a particular meter roller configuration, the rotation rate of the meter roller 28 controls the flow of flowable particulate material 26 into the air stream 24. For example, as the meter roller 28 rotates, the meter roller transfers material through an opening 36 in the metering system 18 into a respective conduit 22 (e.g., into a conduit associated with a respective row unit or group of row units). The material then mixes with air from the air source 20, thereby forming an air/material mixture 38. The mixture then flows to the respective row unit(s) of the implement via pneumatic conduits, where the seeds and/or fertilizer are deposited within the soil.

Figure 3:
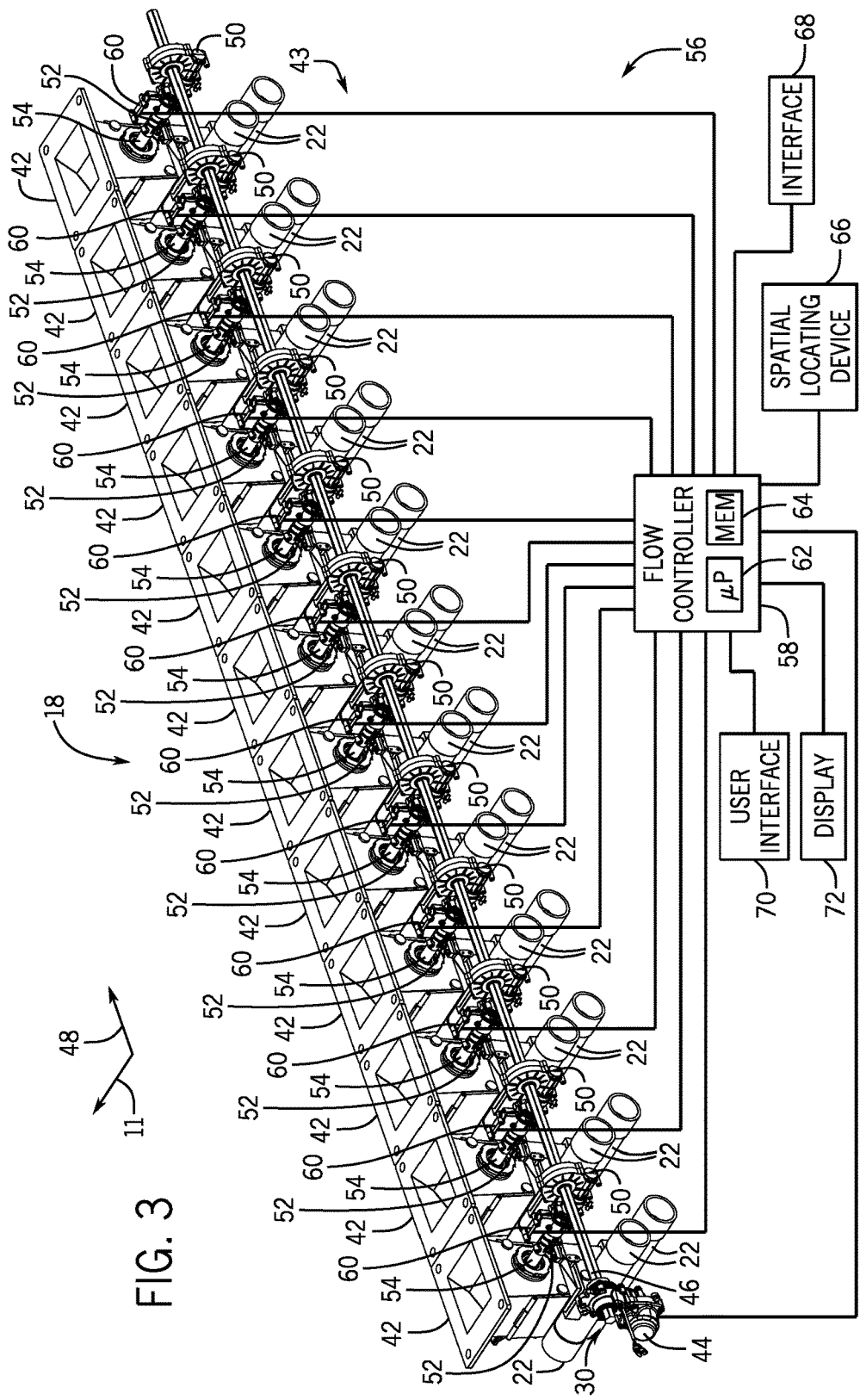
FIG. 3 is a perspective view of an embodiment of a metering system that may be employed within the air cart of FIG. 1.

FIG. 3 is a perspective view of an embodiment of a metering system 18 that may be employed within the air cart of FIG. 1. In the illustrated embodiment, the metering system 18 includes twelve meter rollers, and each meter roller is disposed within a respective housing 42. The housings 42 are configured to receive flowable agricultural material from a common tank compartment and to direct the flowable agricultural material to respective conduits 22. In the illustrated embodiment, each housing 42 is fluidly coupled to two conduits 22. A selector (e.g., within the housing 42) may be configured to direct the agricultural product (e.g., flowable particulate material) to one of the two conduits 22, for example. As previously discussed, each conduit 22 is configured to direct the flowable particulate material to a respective row unit or group of row units for disposition into the soil. In the illustrated embodiment, each meter roller is oriented substantially parallel to the direction of travel 11, and each housing 42 is configured to house a single meter roller. However, it should be appreciated that in certain embodiments, each housing 42 may be configured to house multiple meter rollers (e.g., axially aligned with one another and coupled to a common shaft). While the illustrated metering system 18 includes twelve housings 42, it should be appreciated that in alternative embodiments, the metering system may include more or fewer housings.

In the illustrated embodiment, the metering system 18 includes a flow control system 43 configured to control the rotation rate of the meter rollers, thereby controlling the flow rate of flowable particulate material (e.g., agricultural product) to the row units. The flow control system 43 includes the drive assembly 30, which is configured to drive each meter roller to rotate. In the illustrated embodiment, the drive assembly 30 includes a drive unit 44 configured to drive a drive shaft 46 to rotate. The drive unit 44 may include an electric motor and/or a hydraulic motor, among other suitable drives. For example, in certain embodiments, the drive unit may include a gearbox configured to couple the drive shaft to a wheel of the air cart such that movement of the air cart drives the drive shaft to rotate. In the illustrated embodiment, the drive shaft 46 is oriented substantially perpendicular to the direction of travel 11. Accordingly, the drive shaft 46 is oriented substantially parallel to a lateral axis 48 of the air cart. As used herein, substantially perpendicular may refer to an angle of about 45 to 135 degrees relative to an axis/direction (e.g., the direction of travel 11). In further embodiments, the drive shaft may be oriented substantially parallel to the direction of travel, or at any other suitable angle.

In the illustrated embodiment, the drive assembly 30 also includes multiple gear assemblies 50 configured to drive the respective meter rollers. As discussed in detail below, each gear assembly 50 includes an input coupled to the drive shaft and an output configured to drive a respective meter roller. In addition, a first rotational axis of the input is substantially perpendicular to a second rotational axis of the output. Accordingly, in the illustrated embodiment, each gear assembly 50 is configured to convert rotational motion of the drive shaft 46 about an axis substantially parallel to the lateral axis 48 into rotational motion of a respective meter roller about an axis substantially parallel to the direction of travel 11. In some embodiments, a transmission assembly may be configured to control the rotation motion of the respective rollers, based at least on a control scheme.

In the illustrated embodiment, a transmission assembly 52 is coupled to each gear assembly 50. Each transmission assembly 52 is configured to change gear ratios in response to a corresponding control signal. The gear ratios control rotation speed (e.g., angular velocity) of the meter rollers. In some embodiments, the transmission assembly 52 may establish a direct mechanical linkage between the drive shaft and the meter roller, such that there may be no slippage between the drive shaft and the meter roller.

In certain embodiments, the transmission assemblies 52 may independently engage and disengage rotation of each meter roller while the drive shaft 46 is rotating. For example, by disengaging rotation of a meter roller, the output of flowable agricultural product through the respective conduit 22 may be substantially terminated. As a result, output of the flowable agricultural product from row unit(s) that receive the flowable agricultural product from the respective conduit 22 may be terminated. Because each conduit 22 may provide product to a different section of the implement, output of the flowable agricultural product from row unit(s) within each section may be controlled. Furthermore, as discussed in detail below, each transmission assembly 52 may be controlled to adjust the rotation rate of the respective meter roller, thereby controlling the rate at which the flowable agricultural product is transferred from the tank to the respective conduit. In addition, in certain embodiments, one or more of the transmission assemblies (e.g., all of the transmission assemblies) may be omitted, such that the gear assembly 50 directly drives the respective meter roller.

In the illustrated embodiment, an output of each transmission assembly 52 is coupled to the respective meter roller via a driven shaft 54. In certain embodiments, the driven shaft 54 may be flexible, thereby facilitating an offset (e.g., lateral offset and/or vertical offset) between the transmission assembly output and the meter roller. For example, flexible driven shafts may enable the gear assemblies 50 to be spaced closer together along the drive shaft 46 (e.g., as a tightly spaced group proximate to the drive unit 44). Accordingly, the length of the drive shaft 46 may be reduced, thereby reducing the size of the drive assembly 30. As a result, the drive assembly 30 may utilize less space on the air cart. In further embodiments, one or more driven shafts 54 may be substantially rigid. Furthermore, in certain embodiments, the output of a transmission assembly 52 may be directly coupled to a respective meter roller. Moreover, in certain embodiments, a shaft (e.g., a flexible shaft, a rigid shaft, etc.) may be disposed between the gear assembly and the transmission assembly.

While each component of the drive assembly 30 is positioned behind the housings 42 relative to the direction of travel 11, it should be appreciated that in certain embodiments, one or more components of the drive assembly 30 (e.g., the drive unit 44, the drive shaft 46, the gear assemblies 50, the transmission assemblies 52, the driven shafts 54, or a combination thereof) may be positioned in front of the housings relative to the direction of travel 11. For example, in certain embodiments, the air source may be positioned in front of the metering system relative to the direction of travel (e.g., embodiments in which the air cart is configured to be towed between the tow vehicle and the implement). In such embodiments, each component of the drive assembly may be positioned in front of the housings relative to the direction of travel.

In the illustrated embodiment, the flow control system 43 includes a control system 56 configured to control operation of the transmission assemblies 52 and the drive unit 44. In the illustrated embodiment, the control system 56 includes a flow controller 58 and multiple transmission assembly controllers 60. As illustrated, each transmission assembly controller 60 is associated with a respective transmission assembly 52 and communicatively coupled to the flow controller 58. The flow controller 58 is also communicatively coupled to the drive unit 44. In certain embodiments, the flow controller 58 is configured to output a respective flow control signal to each transmission assembly controller 60 indicative of a respective target flow rate of the flowable agricultural product, and each transmission assembly controller 60 is configured to output a gear ratio control signal (e.g., transmission assembly control signal) to the respective transmission assembly 52 based on the respective flow control signal.

In certain embodiments, each transmission assembly 52 is configured to change gear ratios, based on a control signal to control the speed of the meter rollers. In more detail, in some instances, the metering system 18 may include an actuator (e.g., electromechanical actuator, hydraulic actuator, pneumatic actuator, mechanical actuator, etc.) that may receive the control signal. After receiving the control signal, the actuator may cause the transmission assembly 52 to change gear ratios. For example, an input shaft of the transmission assembly 52 may be coupled to a large gear, and an output shaft driving the meter rollers may be coupled to a smaller gear, such that the speed at which the meter rollers dispenses flowable particulate material 26 may be increased due to the increase in the angular speed of the output drive shaft (e.g., when the actuator receives a control signal to couple the large gear and the smaller gear). In additional embodiments, the actuator may control the input and/or output ratio of a CVT to control the speed of the meter rollers of a continuously variable transmission. As a further example, the flow controller 58 may output a respective flow control signal to each transmission assembly controller 60 indicative of a respective target flow rate of the flowable particulate material 26 (e.g., flowable agricultural product), and each transmission assembly controller 60 may output a gear ratio signal to the respective transmission assembly 52 based on the respective flow control signal.

In some embodiments, the changes in gear ratio may be in response to a control signal from the transmission assembly controller 60. The actuator may receive the control signal to actuate the transmission assembly 52 and change the gear ratio. Actuating the transmission assembly 52 in response to the control signal may cause the transmission assembly 52 speed up or slow down the meter roller (e.g., control the rate at which the meter roller dispenses flowable particulate material 26). In other embodiments the change in gear ratio may be in response to a gear ratio signal to the transmission assembly 52. In addition, the changes in gear ratio may be due to a mechanical system. For example, a control signal may be absent, such that the gear ratio may be controlled via a lever that may receive a manual user input (e.g., manually shift between gears) to control the gear ratio (e.g., control the rate at which the meter roller dispenses flowable particulate material 26). It should be noted that the flowable particulate material 26 may be dispensed in any suitable direction (e.g., downwards, upwards, laterally, etc.).

As previously discussed, the flow rate of flowable agricultural product to the conduit 22 is at least partially dependent on the rotation rate of the meter roller. In addition, the control signal to the actuator of the transmission assembly 52 may control the rotation rate (e.g., rotations per minute, rotations per second, etc.) of the meter roller. For example, the transmission assembly 52 may be a continuously variable transmission (CVT). As such, the transmission assembly 52 change between gear ratios and the meter roller may be driven to rotate (e.g., by the drive unit 44 via the drive shaft 46 and the gear assembly 50 at a suitable speed (e.g., while experiencing resistance from the flowable agricultural product and/or rotational resistance associated with contact between a meter roller shaft and a bearing surface, etc.) or stop. Therefore, the control system 56 may control the rotation rate of each meter roller by adjusting the gear ratio of each respective transmission assembly 52.

In addition, the control system 56 may instruct a meter roller to stop rotating by sending a suitable signal to the transmission assembly 52. For example, in some embodiments, the actuator could disengage a transmission, such that the transmission assembly 52 shifts to neutral. After the transmission assembly 52 shifts to neutral, the meter roller may slow to a stop (e.g., due to friction in the meter rollers). In addition or alternatively, the actuator may shift the transmission to a locked state to stop the meter roller from rotating.

While the illustrated control system includes a flow controller 58 and transmission assembly controllers 60, it should be appreciated that in certain embodiments, the transmission assembly controllers may be omitted. In such embodiments, the flow controller 58 may output the gear ratio control signal to the transmission assemblies. For example, the flow controller 58 may determine a target flow rate for each conduit, determine a rotation rate of each respective meter roller to establish the respective target flow rate, and output a gear ratio signal to each respective transmission assembly to establish the rotation rate. In some embodiments, the transmission assembly may be a CVT or have discrete gears (e.g., a fixed number of gear ratios). For example, the CVT may be an automatic transmission that may change seamlessly through a continuous range of effective gear ratios via a pulley system, stepless transmission mechanism, and the like. Meanwhile, for a transmission assembly 52 having discrete gears, the gear ratios be determined by the number of discrete gears associated with the input and output shaft.

In certain embodiments, the flow controller 58 may also control the rotation rate of the drive unit 44. For example, the flow controller 58 may instruct the drive unit 44 to rotate at a speed sufficient to drive each meter roller at a target rotation rate (e.g., a rotation rate that establishes the target product flow rate). In addition, the flow controller 58 may be configured to instruct the drive unit 44 to stop rotating (e.g., during transportation of the air cart), thereby substantially terminating flow of agricultural product from the air cart. In some embodiments, there may be one drive system per compartment of storage tank. In alternative embodiments, the metering system may include one drive system for all compartments.

In the illustrated embodiment, the flow controller 58 include a processor, such as the illustrated microprocessor 62, and a memory device 64. The flow controller 58 may also include one or more storage devices and/or other suitable components. The processor 62 may be used to execute software, such as software for controlling the flow control system 43, and so forth. Moreover, the processor 62 may include multiple microprocessors, one or more "general-purpose" microprocessors, one or more special-purpose microprocessors, and/or one or more application specific integrated circuits (ASICs), or some combination thereof. For example, the processor 62 may include one or more reduced instruction set (RISC) processors.

The memory device 64 may include a volatile memory, such as random access memory (RAM), and/or a nonvolatile memory, such as ROM. The memory device 64 may store a variety of information and may be used for various purposes. For example, the memory device 64 may store processor-executable instructions (e.g., firmware or software) for the processor 62 to execute, such as instructions for controlling the flow control system 43. The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., prescription maps, implement ground speed, etc.), instructions (e.g., software or firmware for controlling the flow control system, etc.), and any other suitable data. Furthermore, in certain embodiments, each transmission assembly controller 60 may also include a process and/or a memory device, among other suitable components (e.g., a storage device, etc.).

In the illustrated embodiment, a spatial locating device 66, such as a global positioning system (GPS) receiver, is communicatively coupled to the flow controller 58. The spatial locating device 66 may be coupled to the air cart, the implement, the tow vehicle, or a combination thereof. The spatial locating device 66 is configured to output a signal indicative of a position of the air cart, the implement, the tow vehicle or a combination thereof. In certain embodiments, the flow controller 58 is configured to output a control signal to each transmission assembly controller 60 based on the position of the implement and a prescription map that includes a target flow rate of agricultural product for each location within a field. For example, for each row unit or group of row units configured to receive agricultural product from a respective conduit 22, the flow controller 58 may determine a target flow rate of product into the respective conduit 22 based on the prescription map and the position of the row unit or group of row units (e.g., as determined based on the position of the spatial locating device and the position of the row unit or group of row units relative to the spatial locating device). For example, the flow controller 58 may identify the location of the row unit or group of row units on the prescription map and output a signal indicative of the target flow rate at the identified location.

In certain embodiments, the prescription map may identify areas where the target flow rate is zero (e.g., at headlands, outside of the field, etc.). When row unit(s) are positioned in such areas, the flow controller 58 may output a control signal to the respective transmission assembly controller 60 indicative of a target flow rate of zero. The transmission assembly controller 60, in turn, may instruct the transmission assembly 52 to disengage (e.g., modifying the transmission assembly 52 into a locked state), thereby stopping rotation of the respective meter roller such that product flow into the respective conduit is substantially terminated. Furthermore, the flow controller 58 may be configured to output a signal indicative of a target flow rate of zero while the row unit(s) are positioned within an area that has already received agricultural product, thereby substantially reducing or eliminating the possibility of over-application of product. The prescription map be stored in the memory 64 and/or received from an interface 68, which may be configured to communicatively couple the flow controller 58 to a primary air cart controller, to a tractor controller, to an implement controller, or a combination thereof. The interface 68 may be configured to interface with a CAN bus, an ISOBUS system, a wireless communication network, or any other suitable communication system.

In the illustrated embodiment, the flow controller 58 is communicatively coupled to a user interface 70 and a display 72. The user interface 70 and the display 72 may be located within a cab of the tow vehicle and/or at a remote site, for example. The user interface 70 and the display 72 may be communicatively coupled to the flow controller 58 by a CAN bus, an ISOBUS system, a wireless connection, or any other suitable connection. The user interface 70 may be configured to enable an operator to manually control the product flow rate through each of the conduits 22. In addition, the display 72 may be configured to present the operator with a graphical representation of the product flow rate into the conduits 22 and/or a graphical representation of the prescription map, for example.

Because the illustrated drive system 30 enables the flow control system 43 to drive each seed meter with a single drive unit, the flow control system 43 may be less complex and less expensive to manufacture than drive assemblies that utilize multiple drive units. For example, certain metering systems include an electric or hydraulic motor coupled to each seed meter. In such configurations, the rotation rate of each seed meter may be controlled by adjusting the rotation rate of the respective motor. However, metering systems employing multiple motors may be more expensive and complex than metering systems that utilize a single drive unit. Accordingly, the illustrated flow control system 43, which facilitates individual control of the rotate rate of each meter roller while utilizing a single drive unit, may produce a less costly and less complex meter system.

Moreover, for metering systems in which the meter rollers are directly driven by one or more motors, the meter rollers are typically replaced when switching between agricultural products (e.g., from an agricultural product having a larger particle size to an agricultural product having a smaller particle size). For example, certain motors (e.g., hydraulic motors) have a minimum rotation rate that may be greater than the target rotation rate of the respective meter rollers. Accordingly, driving each meter roller at the minimum rotation rate of the motor may cause the meter roller to deliver more than the target flow rate of agricultural product into the respective conduit. As a result, to achieve the target flow rate (e.g., after switching between an agricultural product having a larger particle size to an agricultural product having a smaller particle size), each meter roller may be replaced with a meter roller having a different configuration (e.g., more flutes, shallower recesses, etc.). Unfortunately, the process of replacing each meter roller may be significantly time-consuming, thereby reducing the efficiency of seeding operations. However, the illustrated flow control system 43, which includes transmission assemblies 52 that are controllable to control the rotation rate of each respective meter roller, enables the meter rollers to rotate slower than the rotation rate of the drive unit 44. As a result, each meter roller may be rotated at a respective target rotation rate. Accordingly, agricultural product may be switched (e.g., from an agricultural product having a larger particle size to an agricultural product having a smaller particle size) without replacing the meter rollers, thereby increasing the efficiency of seeding operations.

Figure 4:
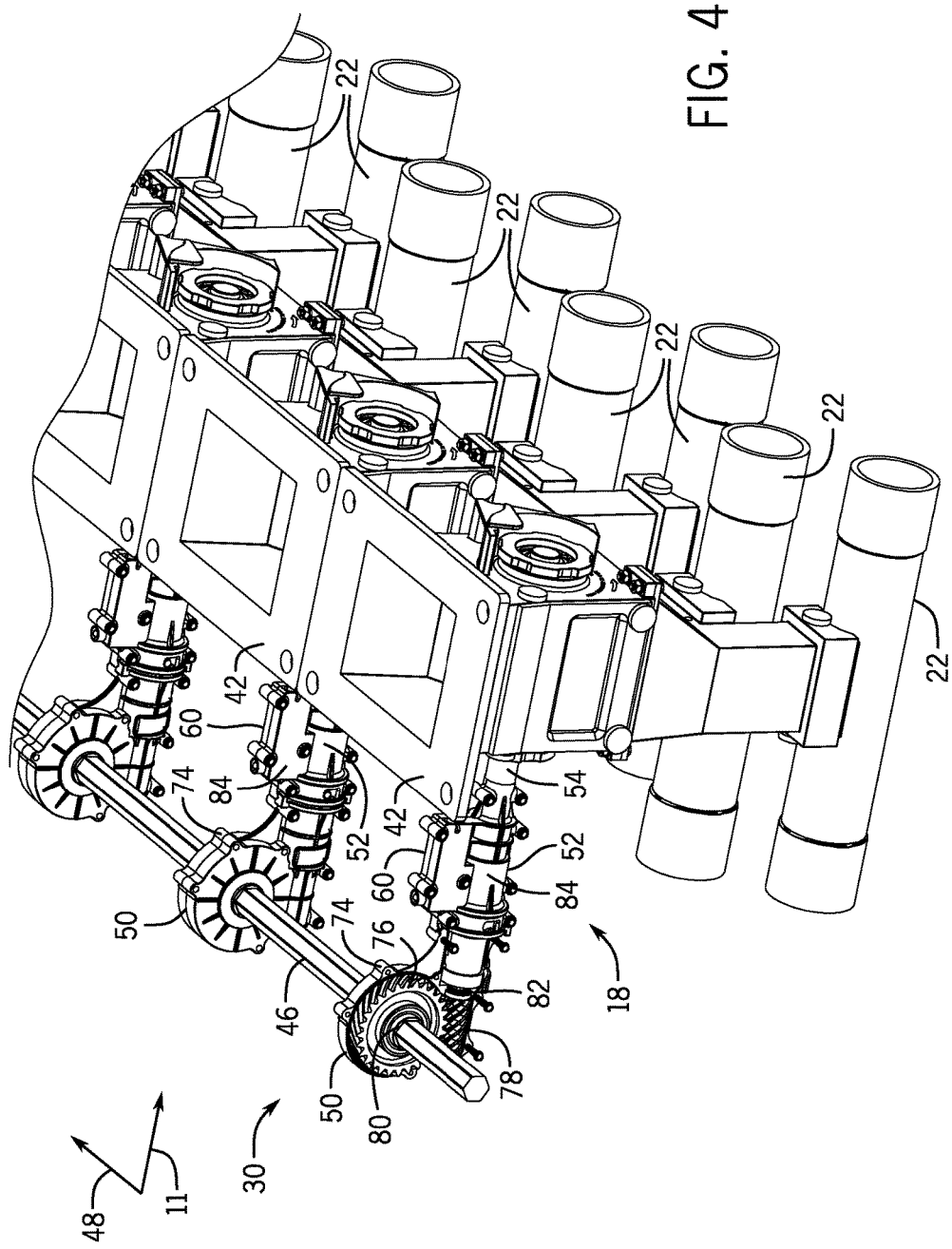
FIG. 4 is a detailed perspective view of a portion of the metering system of FIG. 3.

FIG. 4 is a detailed perspective view of a portion of the metering system 18 of FIG. 3. In the illustrated embodiment, each gear assembly 50 includes a housing 74, a worm gear 76, and a worm 78. While the following subject matter is disclosed with respect to an air cart, the subject matter may also be disclosed with respect to any other type of agricultural system (e.g., seeder). As illustrated, a portion of the housing 74 has been removed from one gear assembly 50 to show the worm gear 76 and the worm 78, which are disposed within the housing 74. As illustrated, the worm gear 76 includes an opening 80 (e.g., input) configured to receive the drive shaft 46. In the illustrated embodiment, the drive shaft 46 has a hexagonal cross-section, and the opening 80 has a corresponding hexagonal shape. Accordingly, rotation of the drive shaft 46 drives the worm gear 76 to rotate about an axis substantially parallel to the lateral axis 48. In addition, teeth of the worm gear 76 engage corresponding grooves of the worm 78. Accordingly, rotation of the worm gear 76 drives the worm 78 to rotate about an axis substantially parallel to the direction of travel 11. The worm 78 includes an output shaft 82 (e.g., output) coupled to the transmission assembly 52. Accordingly, the output shaft 82 may function as a drive input for the transmission assembly 52. While the drive shaft 46 and the opening 80 have a hexagonal shape in the illustrated embodiment, it should be appreciated that in alternative embodiments, the drive shaft and the opening may have other suitable shapes, such as elliptical, square, keyed, or triangular, among others. Furthermore, the transmission assembly 52 enables the driven shaft 54 (e.g., the input shaft for the transmission assembly 52) to rotate faster than the worm output shaft 82 (e.g., the input shaft for the transmission assembly 52). As a result, in some embodiments, the meter roller may rotate faster than the driven shaft 82 (e.g., the input shaft for the transmission assembly 52).

In the illustrated embodiment, each transmission assembly 52 and corresponding transmission assembly controller 60 are disposed within a respective housing 84. That is, each housing 84 is configured to house a respective transmission assembly 52 and a respective transmission assembly controller 60. As illustrated, the transmission assembly/transmission assembly controller housing 84 is positioned proximate to the gear assembly housing 74. However, it should be appreciated that in certain embodiments, the gear assembly 50, the transmission assembly 52, and the transmission assembly controller 60 may be housed within a single housing. Moreover, in certain embodiments, the gear assembly 50, the transmission assembly 52, and the transmission assembly controller 60, or a combination thereof, may be housed within separate housings.

Figure 5:
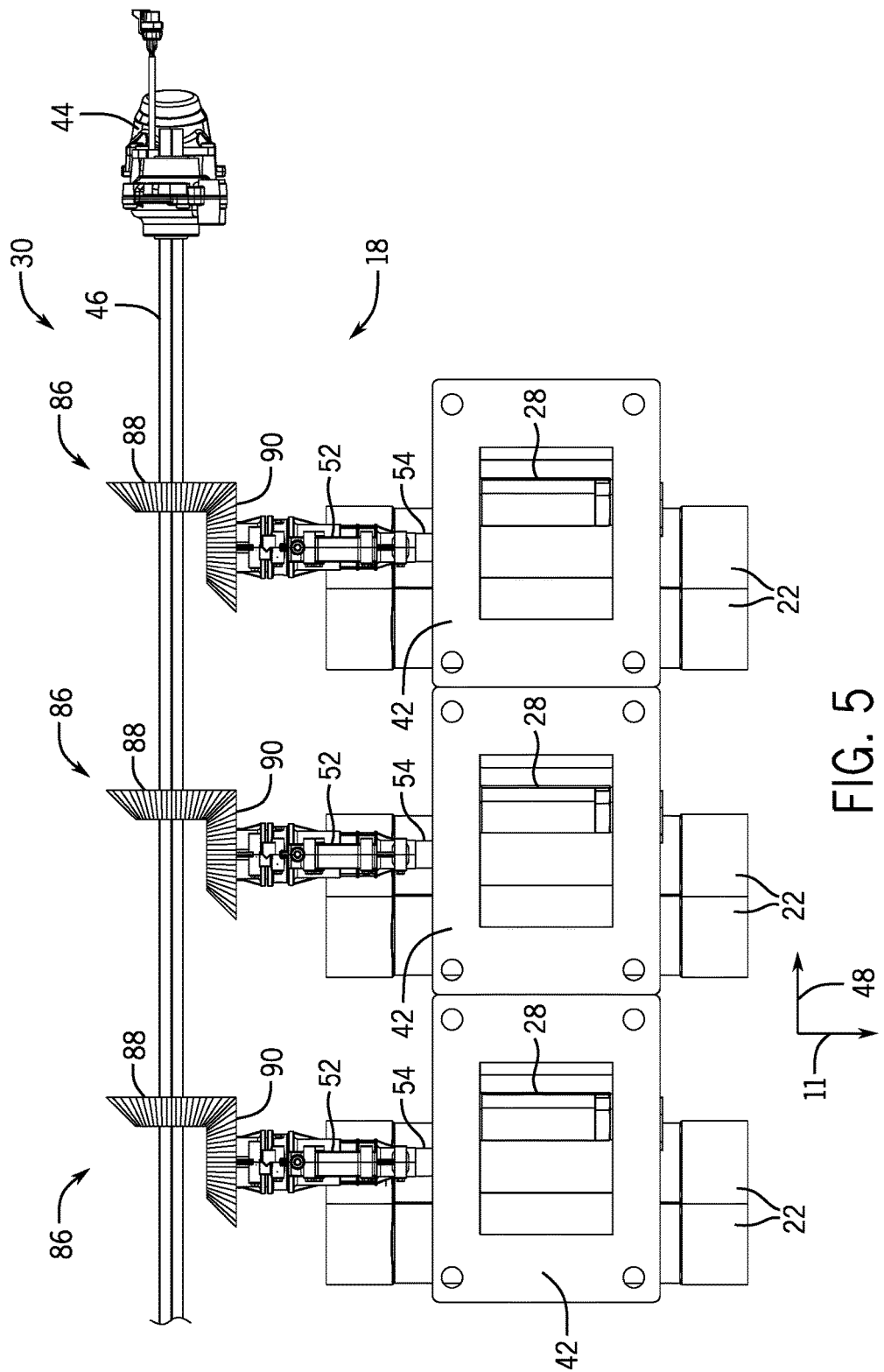
FIG. 5 is a top view of another embodiment of a metering system that may be employed within the air cart of FIG. 1.

FIG. 5 is a top view of another embodiment of a metering system 18 that may be employed within the air cart of FIG. 1. In the illustrated embodiment, the drive assembly 30 includes alternative gear assembly 86, each including a first bevel gear 88 and a second bevel gear 90. As illustrated, the first bevel gear 88 is coupled to the drive shaft 46 (e.g., via an input). Accordingly, rotation of the drive shaft 46 drives the first bevel gear 88 to rotate about an axis substantially parallel to the lateral axis 48. In addition, teeth of the first bevel gear 88 engage corresponding teeth of the second bevel gear 90. Accordingly, rotation of the first bevel gear 88 drives the second bevel gear 90 to rotate about an axis substantially parallel to the direction of travel 11. In certain embodiments, the second bevel gear 90 includes an output shaft (e.g., output) coupled to the transmission assembly 52. Accordingly, the output shaft may function as a drive input for the transmission assembly 52. While the gear assembly 86 does not include a housing in the illustrated embodiment, it should be appreciated that in certain embodiments, a housing may be disposed about the first and second bevel gears.

Figure 6:
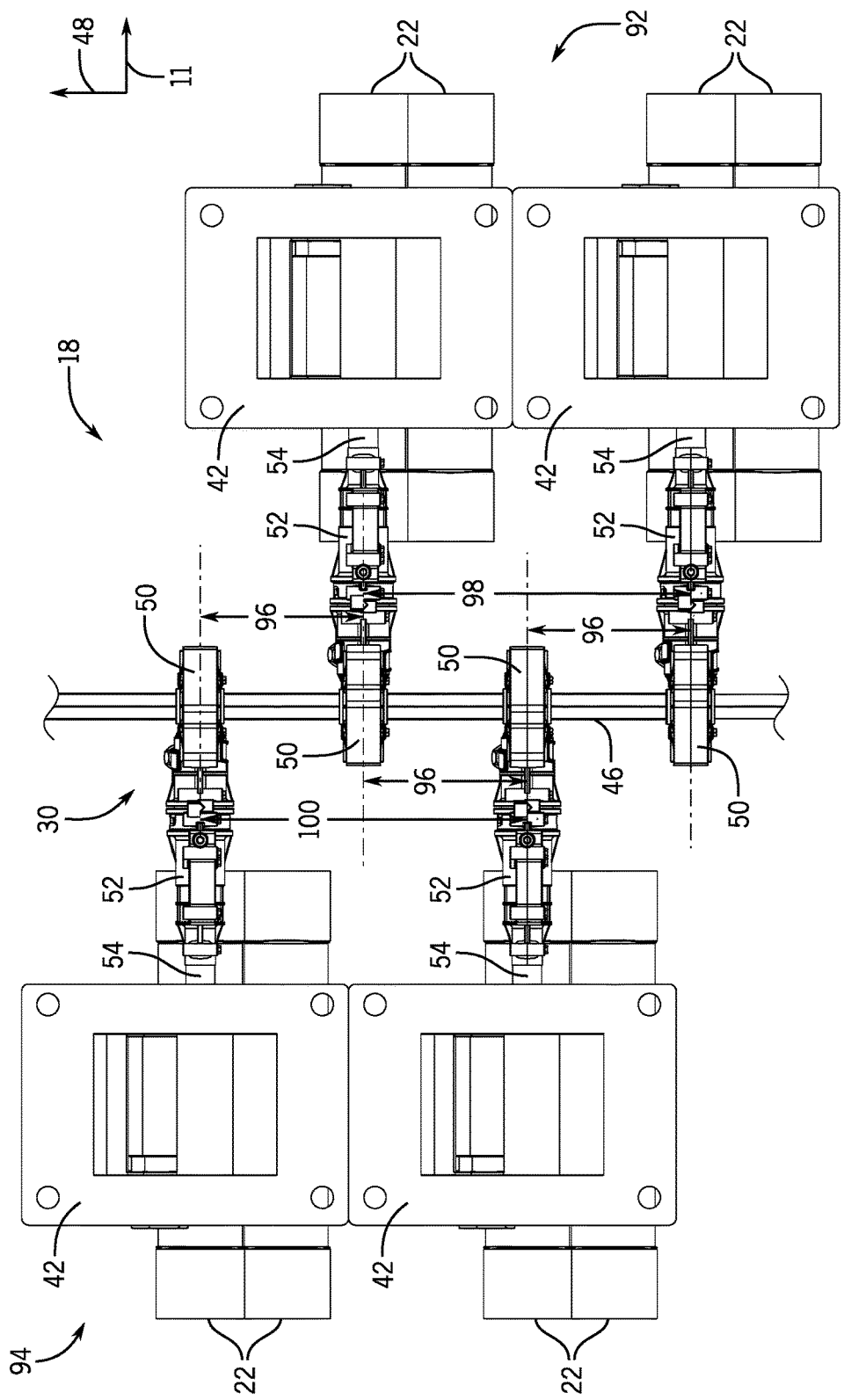
FIG. 6 is a top view of a further embodiment of a metering system that may be employed within the air cart of FIG. 1.

FIG. 6 is a top view of a further embodiment of a metering system 18 that may be employed within the air cart of FIG. 1. In the illustrated embodiment, the drive shaft 46 is oriented substantially perpendicular to the direction of travel 11. Accordingly, the drive shaft 46 is substantially parallel to the lateral axis 48. As illustrated, two housings, each including a meter roller, are positioned on a first side 92 of the drive shaft 46 relative to the direction of travel 11, and two housings 42, each including a meter roller, are positioned on a second side 94 of the drive shaft 46, opposite the first side 92, relative to the direction of travel 11. In the illustrated embodiment, the housings 42 are arranged in an alternating pattern along the lateral axis 48. In addition, each gear assembly 50 on the first side 92 is offset from a corresponding gear assembly 50 on the second side 94 by a centerline-to-centerline offset distance 96. In the illustrated embodiment, the offset distance 96 is about half of the centerline-to-centerline distance 98 between adjacent gear assemblies 50 on the first side 92 and the centerline-to-centerline distance 100 between adjacent gear assemblies 50 on the second side 94. However, it should be appreciated that the offset distance 96 may be larger or smaller in alternative embodiments. Arranging the housings 42 on opposite sides of the drive shaft 46 may substantially reduce the length of the metering system 18, thereby enabling the metering system to be mounted to an air cart having certain spatial constraints (e.g., due to structural members extending along the direction of travel on opposite lateral sides of the metering system). An outlet of the tank/tank compartment providing agricultural product to the housings may be particularly configured to accommodate the positions of the housings.

In certain embodiments, the housings 42 on the first side 92 may be configured to receive agricultural product from a first tank/tank compartment, and the housings 42 on the second side 94 may be configured to receive agricultural product from a second tank/tank compartment. In such embodiments, the flow rate of agricultural product from each tank/tank compartment into respective conduits may be controlled by controlling the respective transmission assemblies 52. Accordingly, agricultural product may be metered from two tanks/tank compartments via a single drive assembly 30 (e.g., having a single drive unit and a single drive shaft 46).

While the adjacent housings 42 on the first side 92 are in contact with one another, and the adjacent housings 42 on the second side 94 are in contact with one another, it should be appreciated that in certain embodiments, the housings 42 on the first 92 and/or the housings 42 on the second side 94 may be spaced apart from one another. Furthermore, while the illustrated embodiment includes four housings 42, it should be appreciated that more or fewer housings may be included in further embodiments. That is, the metering system may include any other suitable even or odd number of housings. In addition, while the number of housings on the first side is equal to the number of housings on the second side in the illustrated embodiment, it should be appreciated that in certain embodiments, more housings may be positioned on the first side or more housings may be positioned on the second side. Moreover, while the illustrated embodiment includes gear assemblies 50 having worm gears and worms, it should be appreciated that in alternative embodiments, the drive assembly 30 may include one or more gear assemblies having bevel gears.

Figure 7:
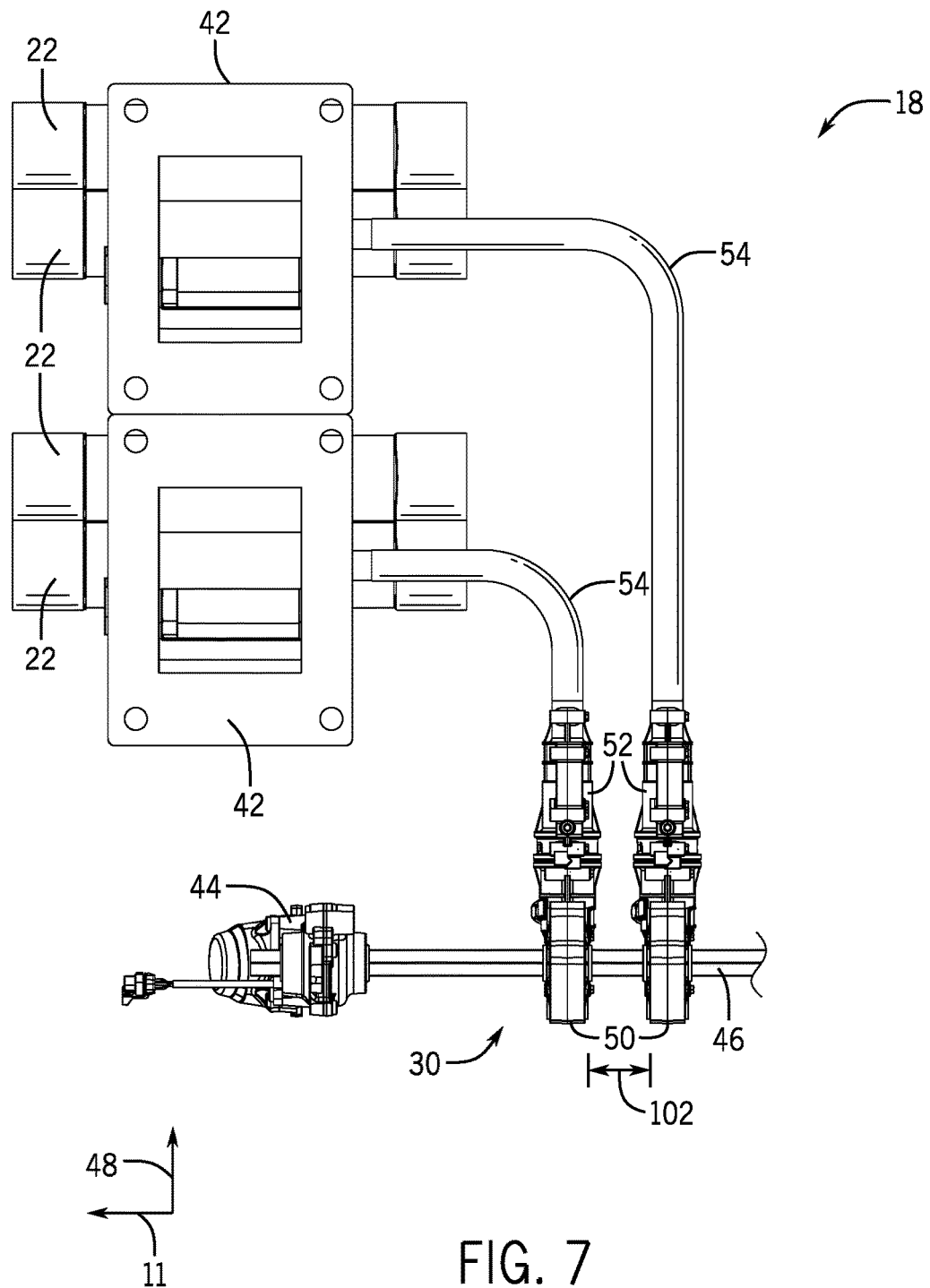
FIG. 7 is a top view of another embodiment of a metering system that may be employed within the air cart of FIG. 1.

FIG. 7 is a top view of another embodiment of a metering system 18 that may be employed within the air cart of FIG. 1. In the illustrated embodiment, a flexible shaft 54 extends from the output of each transmission assembly 52 to the meter roller within the respective housing 42. As illustrated, the flexible shafts 54 enable the gear assemblies 50 and transmission assemblies 52 to be positioned remote from the housings 42. For example, in the illustrated embodiment, the drive shaft 46 is oriented substantially parallel to the direction of travel 11. Accordingly, the output of each transmission assembly 52 rotates about an axis substantially parallel to the lateral axis 48. In alternative embodiments, the drive shaft 46 may be oriented at any other suitable angle relative to the direction of travel 11 (e.g., substantially perpendicular the direction of travel, as shown in FIG. 3). Positioning the drive shaft 46, gear assemblies 50, and transmission assemblies 52 remote from the housings 42 may enable the drive system 30 to accommodate spatial constraints within the air cart. For example, if a structural member of the air cart is positioned rearward of the housings, positioning the drive shaft, the gear assemblies, and the transmission assemblies remote from the housings and/or at a suitable orientation may enable the drive assembly 30 to accommodate the spatial constraints of the air cart.

Furthermore, the gear assemblies 50 are spaced apart from one another by a separation distance 102. In certain embodiments, the separation distance 102 may be less than the separation distance between gear assemblies 50 in the embodiment described above with reference to FIG. 3. Accordingly, the length of the drive shaft 46 may be reduced, thereby reducing the size of the drive assembly 30. As a result, the drive assembly 30 may utilize less space on the air cart.

Figure 8:
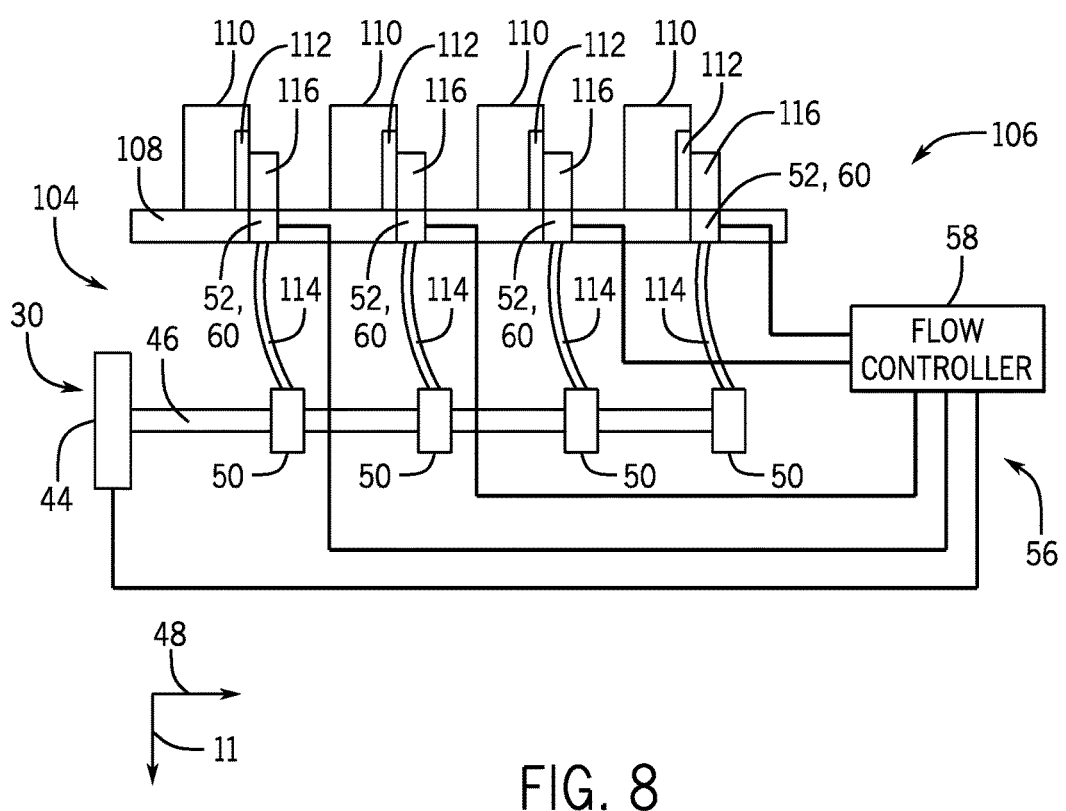
FIG. 8 is a schematic diagram of an embodiment of a metering system for an agricultural planter.

FIG. 8 is a schematic view of an embodiment of a metering system 104 for an agricultural planter 106. As illustrated, the agricultural planter 106 includes a tool bar 108 and four row units 110 coupled to the tool bar 108. The row units 110 may be configured to receive an unmetered flow of agricultural product from a product tank. For example, certain agricultural planters include an inductor box coupled to the product tank. The inductor box is configured to fluidize the agricultural product, and conduits extending from the inductor box are configured to provide the fluidized agricultural product to the row units. Each row unit 110 includes a seed disc 112 (e.g., of a vacuum seed meter), or other suitable rotatable metering device, configured to meter the agricultural product to a seed tube, which in turn, delivers the product to a trench within the soil. Each row unit 110 may also include an opener configured to form the trench, a closing assembly configured to direct displaced soil into the trench, a packer wheel configured to pack the soil onto the deposited agricultural product, or a combination thereof. While the illustrated agricultural planter 106 includes four row units 110, it should be appreciated that in alternative embodiments, the agricultural planter may include more or fewer row units. For example, in certain embodiments, the agricultural planter may include 1, 2, 3, 4, 5, 6, 8, 9, 10, or more row units. In some embodiments, metering system 104 may include on-row product hoppers, such that there is no central product tank feeding the row units.

The agricultural planter 106 includes a drive assembly 30 configured to drive the seed discs 112 to rotate. As illustrated, the drive assembly 30 includes a drive unit 44 and a drive shaft 46 extending from the drive unit 44. In the illustrated embodiment, the drive shaft 46 is oriented substantially parallel to the lateral axis 48. In addition, four gear assemblies 50 are engaged with the drive shaft 46. Each gear assembly 50 includes an input coupled to the drive shaft 46 and an output configured to drive a respective seed disc 112. In addition, a first rotational axis of the input is substantially perpendicular to a second rotational axis of the output. Accordingly, in the illustrated embodiment, each gear assembly 50 is configured to convert rotational motion of the drive shaft 46 about an axis parallel to the lateral axis 48 into rotational motion about an axis parallel to the direction of travel 11.

In the illustrated embodiment, a flexible shaft 114 extends between each gear assembly 50 and a respective transmission assembly 52. A first end of each flexible shaft 114 is coupled to the output of the respective gear assembly 50, and a second end of the flexible shaft 114 is coupled to an input of the transmission assembly 52. An output of each transmission assembly 52 is coupled to a respective second gear assembly 116. Each second gear assembly 116 includes an input coupled to the transmission assembly output and an output configured to drive a respective seed disc 112. In addition, a first rotational axis of the input is substantially perpendicular to a second rotational axis of the output. Accordingly, in some embodiments, each gear assembly 116 may be configured to convert rotational motion of the transmission assembly output about an axis parallel to the direction of travel 11 into rotational motion of a respective seed disc 112 about an axis parallel to the lateral axis 48.

In the illustrated embodiment, each transmission assembly 52 is positioned proximate to the respective second gear assembly 116. However, in certain embodiments, one or more transmission assemblies may be positioned proximate to the respective gear assembly 50. In such embodiments, the transmission assembly may be disposed between the gear assembly 50 and the flexible shaft 114. In addition, each flexible shaft may be directly coupled to an input of a respective second gear assembly.

In the illustrated embodiment, a transmission assembly controller 60 is associated with each transmission assembly 52, and each transmission assembly controller 60 is communicatively coupled to the flow controller 58. The flow controller 58 is also communicatively coupled to the drive unit 44. In certain embodiments, the flow controller 58 is configured to output a respective flow control signal to each transmission assembly controller 60 indicative of a respective target flow rate of agricultural product, and each transmission assembly controller 60 is configured to output a gear ratio control signal to the respective transmission assembly 52 based on the respective flow control signal. In certain embodiments, the flow controller 58 may also control the rotation rate of the drive unit 44. As a result, the control system 56 may control the rotation rate of each seed disc 112 (e.g., based on the respective geospatial position of the row unit 110, the implement ground speed, and/or a prescription map). While the illustrated control system 56 includes a flow controller 58 and transmission assembly controllers 60, it should be appreciated that in certain embodiments, the transmission assembly controllers 60 may be omitted, and the flow controller 58 may output gear ratio control signals directly to the respective transmission assemblies.

Figure 9:
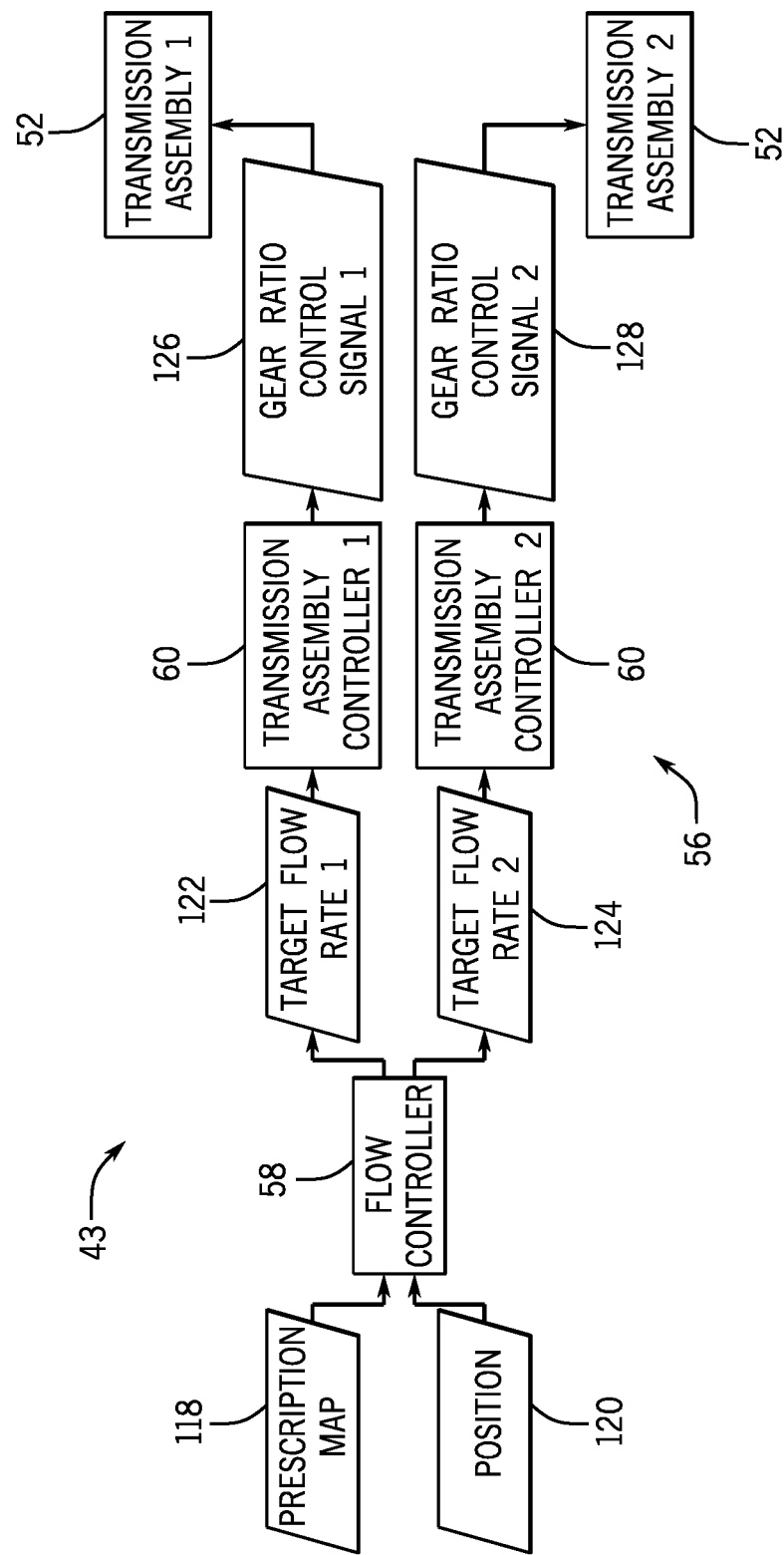
FIG. 9 is a block diagram of an embodiment of a flow control system that may be employed within an agricultural metering system.

FIG. 9 is a block diagram of an embodiment of a flow control system 43 that may be employed within an agricultural metering system. In the illustrated embodiment, the flow controller 58 receives a prescription map 118 (e.g., from an air cart controller) and a position 120 (e.g., from a spatial locating device). The flow controller 58 then determines a target flow rate for each row unit or group of row units configured to receive agricultural product from a respective conduit. In the illustrated embodiment, the flow controller 58 determines a first target flow rate 122 for a first row unit or group of row units positioned at one section of the implement and a second target flow rate 124 for a second row unit or group of row units positioned at another second of the implement. As previously discussed, each target flow rate 122, 124 may be determined based on the implement ground speed, the prescription map 118, and the position of the row unit or group of row units (e.g., as determined based on the position 120 of the spatial locating device and the position of the row unit or group of row units relative to the spatial locating device). For example, the flow controller 58 may identify the location of each row unit or group of row units on the prescription map and output the respective target flow rate at the identified location.

The flow controller 58 then outputs the first target flow rate 122 to a first transmission assembly controller 60 and the second target flow rate 124 to a second transmission assembly controller 60 (e.g., via respective control signals). Each transmission assembly controller 60, in turn, determines a rotation rate of the respective meter roller or seed disc that establishes the respective target flow rate. Each transmission assembly controller 60 then outputs a respective gear ratio control signal to establish the determined rotation rate. In the illustrated embodiment, the first transmission assembly controller 60 outputs a first gear ratio control signal 126 to a first transmission assembly 52, and the second transmission assembly controller 60 outputs a second gear ratio control signal 128 to the second transmission assembly 52.

In some embodiments, the changes in gear ratio may be in response to a gear ratio control signal from the transmission assembly controller 60. The actuator may receive the gear ratio control signal to actuate the transmission assembly 52 and change the gear ratio. Actuating the transmission assembly 52 in response to a gear ratio control signal may cause the transmission assembly 52 speed up or slow down the meter roller (e.g., control the rate at which the meter roller dispenses flowable particulate material 26). In other embodiments the change in gear ratio may be in response to any suitable control signal to the transmission assembly 52. Furthermore, in some embodiments, the transmission assembly 52 may be a CVT or have discrete gears (e.g., a fixed number of gear ratios). For example, the CVT may include an automatic transmission that may change seamlessly through a continuous range of effective gear ratios via a pulley system, stepless transmission mechanism, and the like. Meanwhile, for a transmission assembly 52 having discrete gears, the gear ratios be determined by the number of discrete gears associated with the input and output shaft.

In further embodiments, each gear ratio control signal includes a continuous signal configured to control the gear ratio of the respective transmission assembly. In certain transmission assembly configurations, the portion of rotational energy transfer may be controlled by the gear ratio control signal (e.g., by controlling a percentage of transmission assembly engagement). Accordingly, the rotation rate of each meter roller or seed disc may be controlled by adjusting the gear ratio of the respective transmission assembly 52 via the continuous signal. While the illustrated flow control system 43 includes two transmission assembly controllers 60 and two transmission assemblies 52, it should be appreciated that in alternative embodiments, the flow control system may include more or fewer transmission assemblies and a corresponding number of transmission assembly controllers.

While the metering systems described above are configured to drive the meter rollers and seed discs to rotate via a drive assembly that includes a drive shaft and gear assemblies, it should be appreciated that in certain embodiments (e.g., embodiments including transmission assemblies controllable by a gear ratio control signal), the meter rollers and/or seed discs may be driven to rotate by other drive assembly configurations. For example, in certain embodiments, a sprocket or a pulley may be coupled to an input of each transmission assembly, and a chain or belt may engage (e.g., extend about) the sprockets or pulleys. The drive unit may engage the chain or belt (e.g., via a sprocket or pulley) and drive the chain or belt to rotate, thereby providing a rotational input to each transmission assembly.

Figure 10:
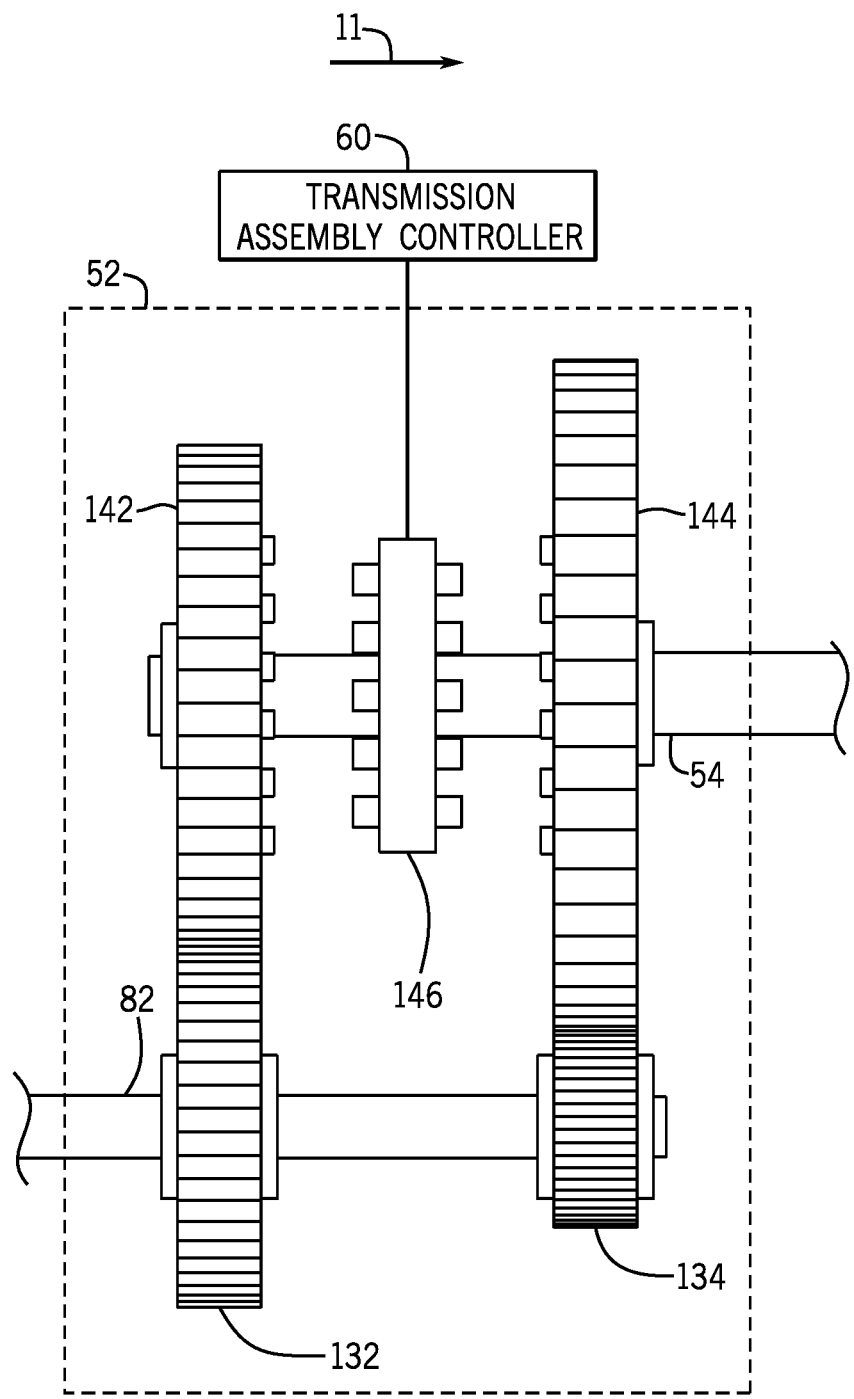
FIG. 10 is a schematic diagram of an embodiment of a transmission assembly employed within an agricultural metering system.

FIG. 10 is a schematic diagram of an embodiment of a transmission assembly 52 that may be employed within an agricultural metering system. While only one transmission assembly is shown, the agricultural metering system may include any suitable number of transmission assemblies 52 (e.g., equal to the number of meter rollers). In the illustrated embodiment, the input shaft 82 functions as a drive input for the transmission assembly 52, and the driven shaft 54 extends from the output of the transmission assembly 52. As mentioned above, the input drive shaft 82 may be part of the worm. In further embodiments, a flexible shaft may be coupled to the input of the transmission assembly 52. Furthermore, each of the transmission assemblies 52 is coupled to a respective meter roller via the driven shaft 54. For example, the driven shaft 54 may be directly coupled to the respective meter roller, such that the rate of rotation of the driven shaft 54 may be equal to the rate at which the respective meter roller rotates to dispense flowable particulate material.

In the illustrated embodiment, the transmission assembly 52 includes a first input gear 132, a second input gear 134, a first driven gear 142, and a second driven gear 144. As illustrated, the first input gear 132 has a larger diameter than the second input gear 134, and the first driven gear 142 has a smaller diameter than the second driven gear 144. Moreover, the first input gear 132 and the second input gear 134 are fixed to the shaft 82, such that the input gears rotate with the shaft 82. In addition, the first driven gear 142 and the second driven gear 144 are rotatably coupled to the driven shaft 54 (e.g., may rotate freely about the driven shaft, but may not translate relative to the driven shaft). As illustrated, rotation of the shaft 82 drives the first input gear 132 and the second input gear 134 to rotate about an axis substantially parallel to the direction of travel 11. In addition, the teeth of the first input gear 132 engage corresponding teeth of the first driven gear 142. The teeth of the second input gear 134 engage corresponding teeth of the second driven gear 144. Accordingly, rotation of the first input gear 132 drives rotation of the first driven gear 142. And, rotation of the second input gear 134 drives the rotation of the second driven gear 144.

Furthermore, the transmission assembly controller 60 is configured to control a position of a moveable gear 146 to selectively engage the first driven gear 142 or the second driven gear 144. The moveable gear 146 is fixed to the driven shaft 54. As such, the moveable gear 146 rotates with the driven shaft 54. Furthermore, the moveable gear 146 may translate along the driven shaft 54 (e.g., along the direction of travel 11) to engage to either of the first driven gear 142 or the second driven gear 144. The moveable gear may have teeth substantially oriented towards the direction of travel 11, and the first driven gear 142 and the second driven gear 144 may be configured to have openings configured to receive the teeth of the moveable gear 146, thereby selectively coupling the driven shaft gear to the moveable gear 146. Accordingly, the moveable gear 146 may engage with the first or second driven gear, thereby driving the driven shaft 54 to rotate at the same speed as the engaged driven gear.

In some embodiments, the changes in gear ratio may be in response to a gear ratio control signal from the transmission assembly controller 60. The actuator may receive the gear ratio control signal (e.g., from the transmission assembly controller 60) to control the position of the moveable gear 146 and change the gear ratio. For example, the actuator may control the rotational speed of the driven shaft 54 (e.g., and the associated meter rollers) by selectively controlling whether the moveable gear 146 engages with the first driven gear 142 or the second driven gear 144. In alternative embodiment, a lever could control 146. For example, manual inputs to the lever may control whether the moveable gear 146 engages with the first driven gear 142 or the second driven gear 144. Furthermore, in some embodiments, the transmission assembly controller 60 may determine the gear ratio based on a target flow rate and speed of the driven shaft 54. As such, the transmission assembly controller may then instruct the transmission assembly 52 to select the suitable gear ratio.

For example, the moveable gear 146 may engage to the first driven gear 142, thereby causing the driven shaft 54 to rotate at a first rate (i.e., the rate at which the first driven gear 142 rotates). Alternatively, the moveable gear 146 may engage to the second driven gear 144, thereby causing the driven shaft 54 to rotate at a second rate (i.e., the rate at which the second driven gear 144 rotates). The second rate may be slower than the first rate. In the illustrated embodiment, the transmission assembly controller 60 may be configured to process a signal to translate the moveable gear 146 to couple to the first driven gear 142 or the second driven gear 144. As such, in the illustrated embodiment, the transmission assembly controller may control the speed of the driven shaft 54. In some embodiments, the driven shaft may be driven (e.g., controlled) to rotate faster than the shaft 82.

Furthermore, the transmission assembly 52 may be configured to shift to a neutral position, as shown in the current illustrated embodiment, to disengage the shaft 82 from the driven shaft 54. In some embodiments, disengaging the shaft 82 from the driven shaft 54 may cause the meter roller to slow down and/or stop. In some embodiments, the actuator may shift the transmission to a locked state to stop the meter roller from rotating. The transmission assembly 52 illustrated in FIG. 10 is configured to establish a two gear ratios. That is, a first gear ratio while the moveable gear 146 is engaged with the first driven gear 142, and a second gear ratio while the moveable gear 146 is engaged with the second driven gear 144. However, in additional embodiments of the transmission assembly, the transmission assembly may be configured to establish any suitable number of gear ratios. In some embodiments, the transmission assembly may include planetary gears. Furthermore, while the illustrated transmission assembly utilizes gears to switch between gear ratios, in further embodiments, the transmission assembly may include a pulley system, a chain system, and/or any other suitable system for changing gear ratios. For example, the transmission assembly may use a continuously variable transmission (CVT) arrangement, or any other suitable transmission arrangement to switch between gear ratios. Since the aforementioned agricultural metering systems may include more than one transmission assemblies, each of the transmission assemblies may have a different number of gear ratios, and/or the gear ratios at the transmission assemblies may be different from one another.

While only certain features of the disclosed subject matter have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A metering system, comprising:
a first meter roller, comprising a first plurality of protrusions, wherein each protrusion of the first plurality of protrusions is configured to drive flowable particulate material downwardly in response to rotation of the first meter roller;
a second meter roller, comprising a second plurality of protrusions, wherein each protrusion of the second plurality of protrusions is configured to drive the flowable particulate material downwardly in response to rotation of the second meter roller;
a drive shaft configured to be driven in rotation;
a first transmission assembly that establishes a first direct mechanical linkage between the drive shaft and the first meter roller, wherein the first transmission assembly is configured to shift between a first plurality of gear ratios to drive the first meter roller in rotation at a respective first plurality of different speeds relative to the drive shaft; and
a second transmission assembly that establishes a second direct mechanical linkage between the drive shaft and the second meter roller, wherein the second transmission assembly is configured to shift between the second plurality of gear ratios to drive the second meter roller in rotation at a respective second plurality of different speeds relative to the drive shaft,
wherein the first meter roller and the first transmission assembly are positioned on a first side of the drive shaft, and the second meter roller and the second transmission assembly are positioned on a second side of the drive shaft, opposite the first side.

2. The metering system of claim 1, wherein the first and second meter rollers are housed within a respective independent housing, wherein the first and second meter roller are configured to respectively flow particulate material into corresponding conduits for distribution to corresponding row units.

3. The metering system of claim 1, wherein the first transmission assembly is offset from the second transmission assembly along an axis substantially perpendicular to the direction of travel.

4. The metering system of claim 1, wherein the first transmission assembly comprise a moveable gear configured to establish a gear ratio in response to a gear ratio control signal, wherein the moveable gear is configured to establish a fixed connection between one of a plurality of gears.

5. The metering system of claim 4, comprising a control system communicatively coupled to an actuator and configured to output the gear ratio control signal to the actuator, wherein the gear ratio control signal is configured to control a rotation rate of the first meter roller by engaging one of the plurality of gears corresponding to the first transmission assembly to establish the gear ratio.

6. The metering system of claim 5, wherein the gear ratio control signal is configured to cause the actuator to control the rotation rate of the first meter roller by engaging one of the plurality of gears corresponding to the first transmission assembly to establish the gear ratio.

7. The metering system of claim 5, wherein the gear ratio causes the first meter roller to rotate faster than the drive shaft.

8. The metering system of claim 1, wherein the first transmission assembly is configured to shift to a neutral position to disengage the drive shaft from the first meter roller and configured to shift to a locked position to block the rotation of the first meter roller when the drive shaft drive shaft and the first meter roller are disengaged.

9. A metering system, comprising:
a plurality of meter rollers, wherein each meter roller of the plurality of meter rollers comprises a plurality of protrusions, wherein each protrusion of the corresponding plurality of protrusions is configured to drive flowable particulate material downwardly in response to rotation of the meter roller;
a drive shaft configured to be driven in rotation;
a plurality of transmission assemblies each corresponding to a respective meter roller of the plurality of meter rollers, wherein each transmission assembly of the plurality of transmission assemblies establishes a direct mechanical linkage between the drive shaft and the respective meter roller, and each transmission assembly of the plurality of transmission assemblies is configured to shift between a plurality of gear ratios to drive the respective meter roller in rotation at a plurality of different speeds relative to the drive shaft, wherein each transmission assembly of the plurality of transmission assemblies comprise a respective moveable gear of the plurality of moveable gears, wherein the respective movable gear is configured to alternately engage and disengage in response to a gear ratio control signal wherein the respective moveable gear is configured to establish a fixed connection between one of a plurality of gears to establish a gear ratio; and a controls system communicatively coupled to a plurality of actuators, wherein each actuator of the plurality of actuators corresponds to each transmission assembly of the plurality of control signal to the plurality of actuators, wherein the gear ratio control signal is configured to control a rotation rate of the respective meter roller by engaging one of the plurality of gears corresponding to each transmission assembly of the plurality of transmission assemblies to establish the respective gear ratio.

10. The metering system of claim 9, comprising a plurality of housings configured to be fluidly coupled to an agricultural-product tank, wherein at least one meter roller of the plurality of meter rollers is disposed within a housing of the plurality of housings, and the plurality of meter rollers are configured to meter flowable particulate material from the agricultural-product tank.

11. The metering system of claim 9, wherein the drive shaft is oriented substantially perpendicular to the direction of travel of an agricultural vehicle.

* * * * *